US012434986B2

(12) United States Patent
Roman

(10) Patent No.: US 12,434,986 B2
(45) Date of Patent: Oct. 7, 2025

(54) MOBILE SYSTEM AND METHOD FOR SEPARATING WATER AND PAINT

(71) Applicant: Robert Roman, Las Vegas, NV (US)

(72) Inventor: Robert Roman, Las Vegas, NV (US)

( * ) Notice: Subject to any disclaimer, the term of this patent is extended or adjusted under 35 U.S.C. 154(b) by 403 days.

(21) Appl. No.: 18/162,407

(22) Filed: Jan. 31, 2023

(65) Prior Publication Data

US 2024/0254018 A1   Aug. 1, 2024

(51) Int. Cl.
*C02F 1/52* (2023.01)
*B01D 17/02* (2006.01)
*C02F 103/14* (2006.01)

(52) U.S. Cl.
CPC ........ *C02F 1/5245* (2013.01); *B01D 17/0214* (2013.01); *C02F 1/5263* (2013.01); *C02F 2103/14* (2013.01); *C02F 2201/008* (2013.01)

(58) Field of Classification Search
CPC .. C02F 1/5245; C02F 1/5263; C02F 2103/14; C02F 2201/008; B01D 17/02; B01D 17/0208; B01D 17/0204; B01D 17/0202; B01D 17/0214; B01D 17/047
USPC ......... 118/603, 610; 141/135, 250, 251, 263
See application file for complete search history.

(56) References Cited

U.S. PATENT DOCUMENTS

| | | | | |
|---|---|---|---|---|
| 622,416 A | * | 4/1899 | Cherry ...................... | G09F 7/00 40/446 |
| 1,183,327 A | * | 5/1916 | Swallow ................. | E21B 27/00 294/68.25 |
| 3,876,399 A | * | 4/1975 | Saponaro ............... | B01D 47/12 261/112.1 |
| 5,062,963 A | * | 11/1991 | Marcinkowski ....... | B01D 21/34 417/151 |
| 2002/0189646 A1 | * | 12/2002 | Williams .................. | B08B 3/00 134/21 |
| 2004/0195282 A1 | * | 10/2004 | Beletsky ............. | F41C 33/0209 224/244 |
| 2022/0203756 A1 | * | 6/2022 | Logan .................... | B44D 3/128 |

FOREIGN PATENT DOCUMENTS

FR    3043673 A1 *  5/2017  ............ C02F 1/5236

OTHER PUBLICATIONS

English Translation of Patent Publication Fr 3043673A1, published May 19, 2017. (Year: 2017).*

* cited by examiner

*Primary Examiner* — Joseph W Drodge
(74) *Attorney, Agent, or Firm* — FisherBroyles, LLP; Rob L. Phillips

(57) ABSTRACT

A first 5-gallon bucket with a drain, drain plug and drainpipe and a second 5-gallon bucket with a lid having an opening. In combination, the pair of 5-gallon buckets facilitate the separation of water and paint allowing the proper disposal of the paint. One method of using the 5-gallon buckets involves: (i) pouring paint water into the first 5-gallon bucket; (ii) adding aluminum sulfate and hydrated lime; (iii) waiting for the aluminum sulfate and hydrated lime to separate the paint and water with the paint collecting at the bottom of the bucket; (iv) positioning the first 5-gallon bucket atop the second 5-gallon bucket with the drain aligned with the lid opening; and (v) pushing the drainpipe down allowing water to enter the upper opening of the drainpipe and pour into the second bucket; and (vi) stopping efforts to push down the drainpipe before paint begins to enter the drainpipe.

18 Claims, 8 Drawing Sheets

MOBILE SYSTEM AND METHOD FOR SEPARATING WATER AND PAINT

FIELD OF THE INVENTION

The embodiments of the present invention relate to a mobile system and method for separating water and paint.

BACKGROUND

Disposal is one of the biggest problems facing painters at construction sites and similar locations. Many paints (e.g., acrylic) are toxic and may not be poured into city drainage systems. Heretofore, there have been few options to deal with paint-infused water other than transporting the paint-infused water to a certified disposal location. Some persons also clean paint brushes using a garden hose allowing the paint to pour onto, and seep into, the ground which is also a hazard and an improper method of disposal.

Thus, there exists a need for a mobile system and method for separating water and paint thereby preventing improper disposal of paint and other hazardous chemical.

SUMMARY

The embodiments of the present invention involve a first 5-gallon bucket with a drain, drain plug and drainpipe and a second 5-gallon bucket with a lid having an opening. In combination, the pair of 5-gallon buckets facilitate the separation of water and paint allowing the proper disposal of the paint.

One method of using the 5-gallon buckets involves: (i) pouring paint water into the first 5-gallon bucket; (ii) adding aluminum sulfate and hydrated lime; (iii) waiting for the aluminum sulfate and hydrated lime to separate the paint and water with the paint collecting at the bottom of the bucket; (iv) positioning the first 5-gallon bucket atop the second 5-gallon bucket with the drain aligned with the lid opening; and (v) pushing the drainpipe down allowing water to enter the upper opening of the drainpipe and pour into the second bucket; and (vi) stopping efforts to push down the drainpipe once before paint begins to enter the drainpipe.

One method of using the pair of 5-gallon buckets comprises: (i) pouring dirty paint water into the first 5-gallon bucket with the drain and drainpipe; (ii) adding aluminum sulfate and hydrated lime to the dirty paint water; (iii) allowing sufficient time (e.g., 10-15 minutes) for the aluminum sulfate and hydrated lime to separate the paint from the water such that the paint collects at the bottom of the bucket; (iv) positioning the first 5-gallon bucket onto the second 5-gallon bucket such that the drain of the first bucket is aligned with the lid opening of the second bucket; (v) removing a drainpipe lid; (vi) pushing the drainpipe down allowing water to enter the upper opening of the drainpipe and pour into the second bucket; and (vii) stopping efforts to push down the drainpipe once the majority of the water has been drained and before paint (or paint sludge) begins to enter the drainpipe and drain into the second bucket.

Paint sludge remaining in the first bucket after separation may be poured into a conventional bucket where the water is allowed to evaporate leaving paint chips. Alternatively, the paint sludge may be treated with absorbing material (e.g., cat litter) causing the sludge to become a solid or quasi-solid. In either instance, the paint chips or solid may be disposed of in a routine fashion.

Other variations, embodiments and features of the present invention will become evident from the following detailed description, drawings and claims.

DETAILED DESCRIPTION

Figure 1:
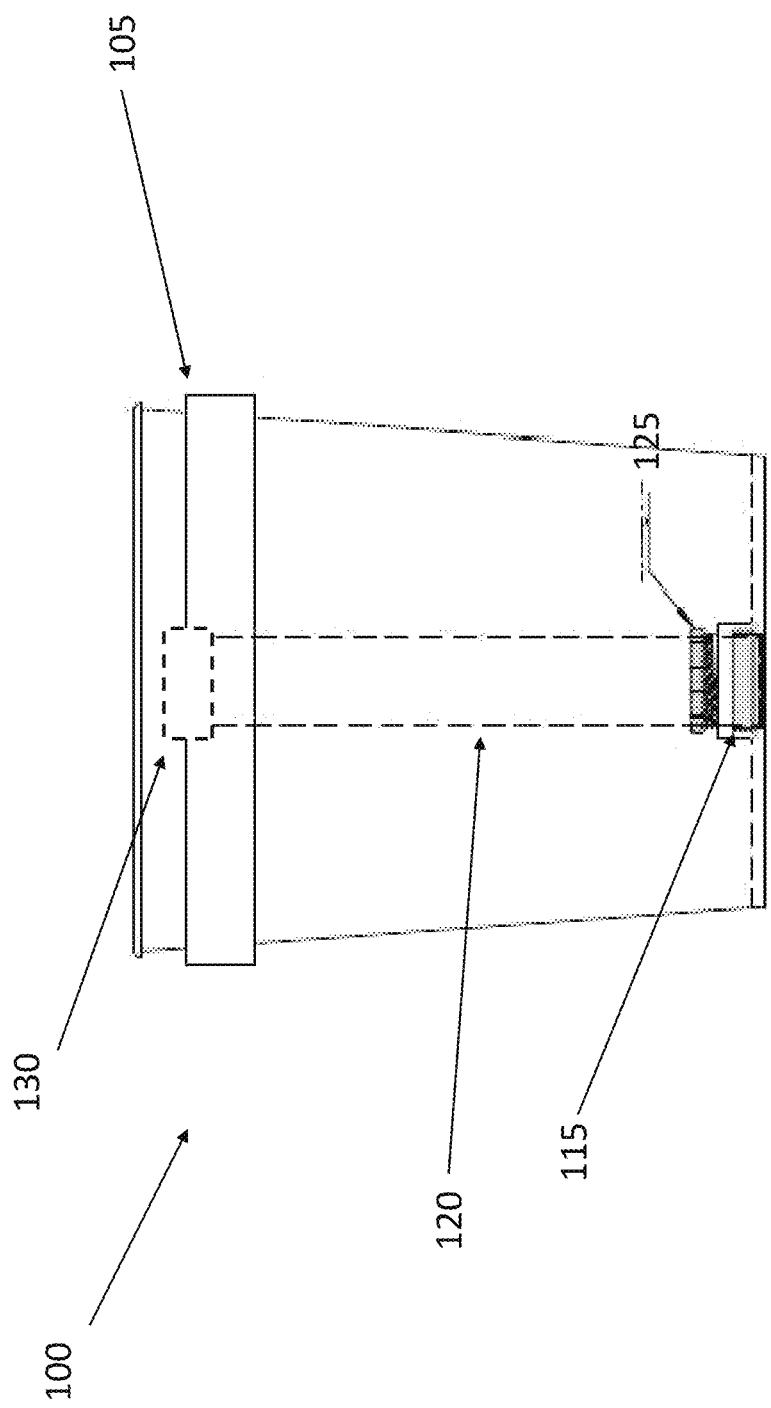
FIG. 1 illustrates a transparent side view of an empty conventional 5-gallon bucket with a drainpipe according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the components described herein may be fabricated using any known techniques and may be fabricated of any available materials suitable for the desired task. Those skilled in the art will recognize that the water and paint separation system may be fabricated using off-the-shelf parts available at most hardware stores. In one embodiment, the parts and components necessary to fabricate the water and paint separation system are sold as a kit. In other embodiments, the water and paint separation system may be purchased in assembled form whereby a manufacturer uses customized parts or a combination of customized parts and off-the-shelf parts to fabricate the same.

FIG. 1 shows an exemplary 5-gallon bucket 100 of the type suitable for the embodiments of the present invention. While a circular 5-gallon bucket is described herein, it is well conceived that buckets of other capacities (e.g., 10 gallon) and shapes (e.g., square) may be used with the embodiments of the present invention. The bucket 100 includes a plastic reinforcing band 105. The bucket 100 includes a drain 115 and drainpipe 120 having two ends 120-1, 120-2 (best seen in FIGS. 2-7). When not in use, a first end 120-1 of the drainpipe 120 is positioned generally in the center of the bucket 100 while the second end 120-2 of the drainpipe 120 is slidably engaged with the drain 115. A threaded locking nut 125 serves to secure the drainpipe 120 to the drain 115 when the drainpipe 120 is not in use. A drainpipe lid 130 prevents contents of the bucket 100 from inadvertently entering the drainpipe 120. The drainpipe lid 130 may be threaded or frictionally attached to the first end 120-1 of the drainpipe 120.

Figure 2:
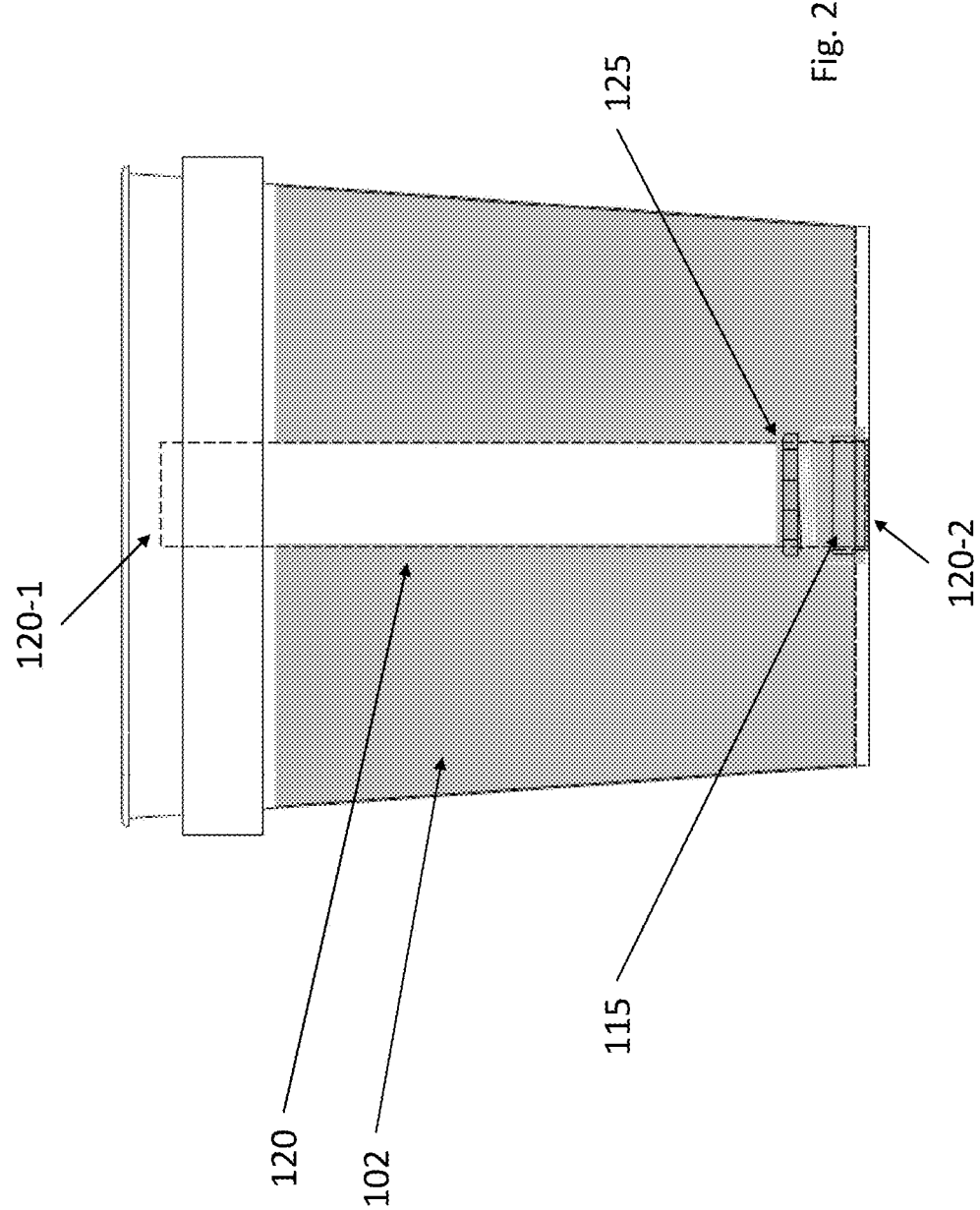
FIG. 2 illustrates a transparent side view of the 5-gallon bucket with a drainpipe and containing dirty paint water according to the embodiments of the present invention.
Figure 3:
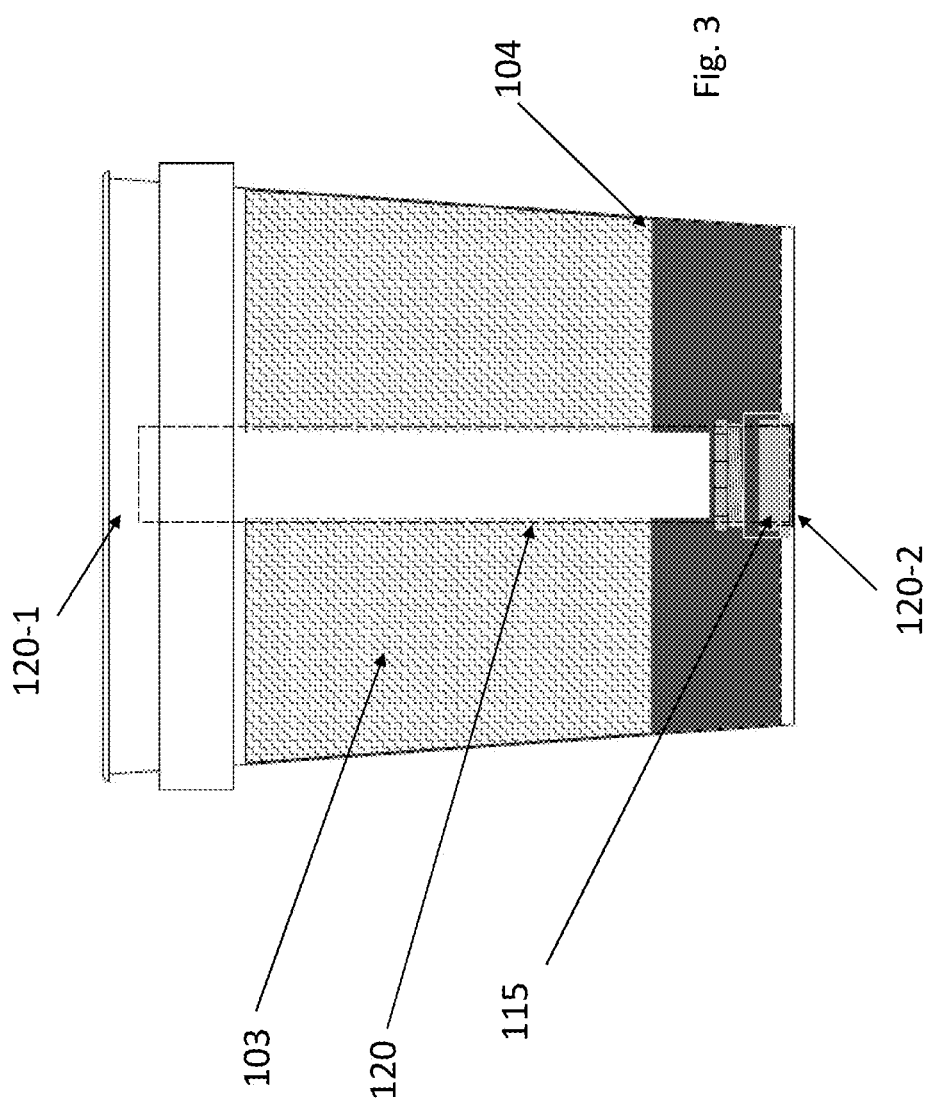
FIG. 3 illustrates a transparent side view of the 5-gallon bucket with a drainpipe and containing separated water and paint according to the embodiments of the present invention.

FIGS. 2-3 show the bucket 100 containing dirty water 102, and separated clean water 103 and paint or paint sludge 104, respectively. Separation of the water and paint may be accomplished by not disturbing the water and paint mixture over a long period of time during which the heavier paint elements naturally sink to the bottom of the bucket 100. To expedite the separation of the water and paint, aluminum sulfate and hydrated lime may be added to the paint and water mixture. The addition of the aluminum sulfate and hydrated lime causes the heavier paint elements to sink quicker than via means of gravity alone. For example, for a 5-gallon bucket, the use of aluminum sulfate and hydrated lime causes suitable separation of water and paint within approximately 10 minutes. The aluminum sulfate bonds to the paint particles in the water and the weight of the aluminum causes the paint to sink and separate from the water. The hydrated lime is added to balance the PH of the water from an acidic state (caused by adding the aluminum sulfate) to a neutral state. Stirring the water after adding the aluminum sulfate prevents the aluminum sulfate from settling to the bottom of the bucket when added to the dirty paint water.

Figure 4:
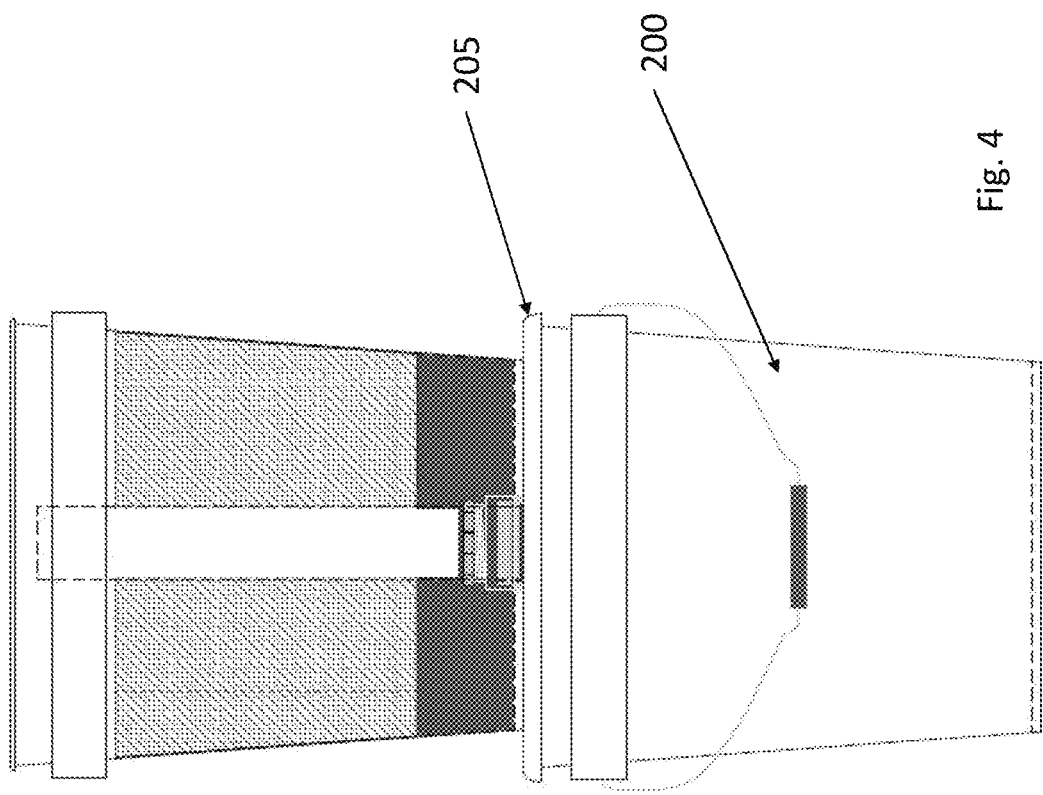
FIG. 4 illustrates a transparent side view of the 5-gallon bucket with a drainpipe and containing separated water and paint positioned on a second 5-gallon bucket according to the embodiments of the present invention.
Figure 5:
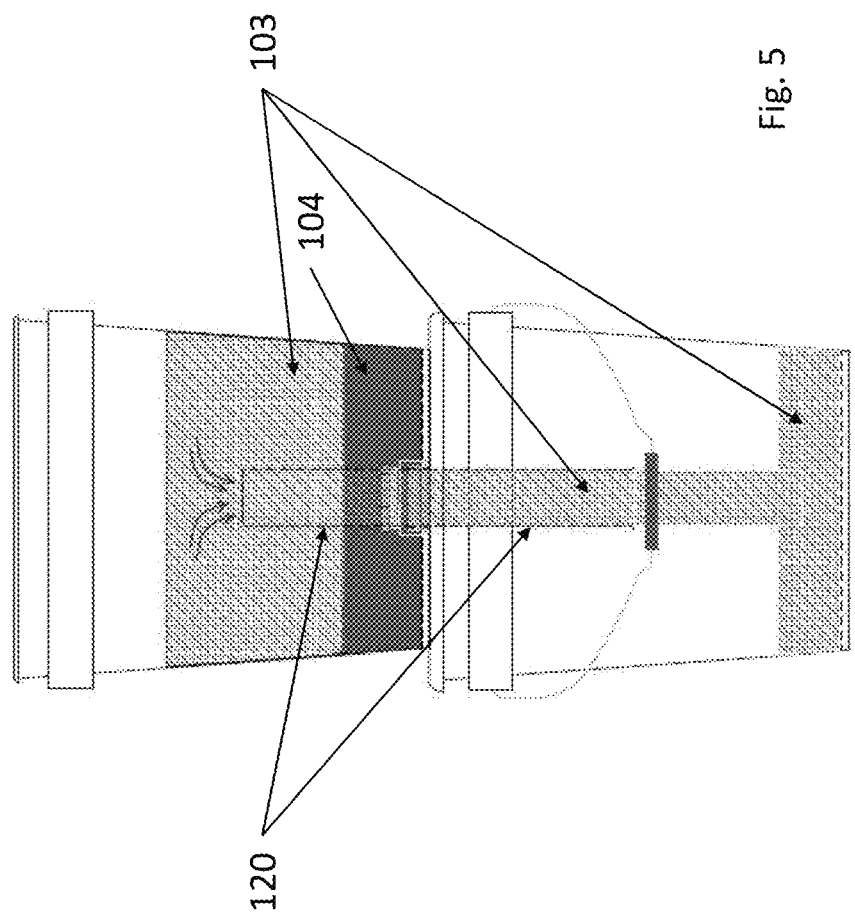
FIG. 5 illustrates a transparent side view of the 5-gallon bucket with a drainpipe and containing separated water and paint positioned on a second 5-gallon bucket with the drainpipe lowered according to the embodiments of the present invention.
Figure 6:
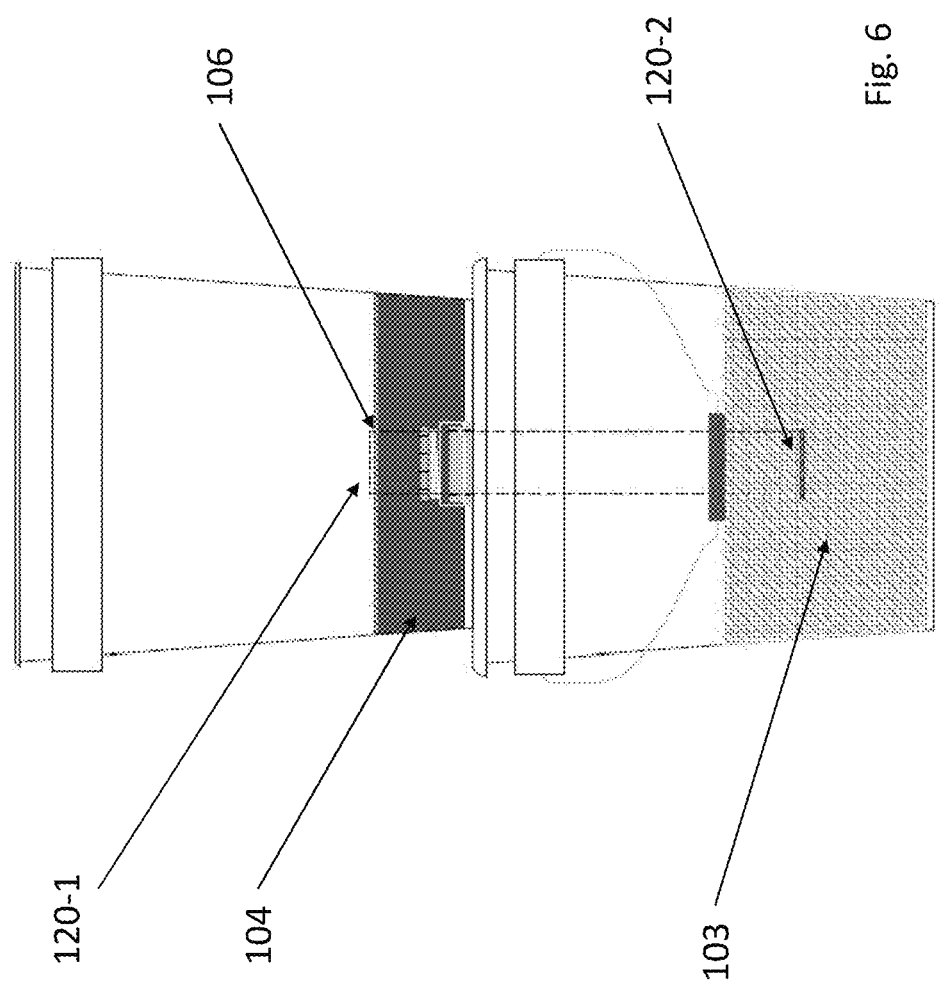
FIG. 6 illustrates a transparent side view of the 5-gallon bucket with a drainpipe and containing separated water and paint positioned on a second 5-gallon bucket with the drainpipe lowered and the clean water drained into the second bucket leaving paint sludge in the first bucket according to the embodiments of the present invention.
Figure 7:
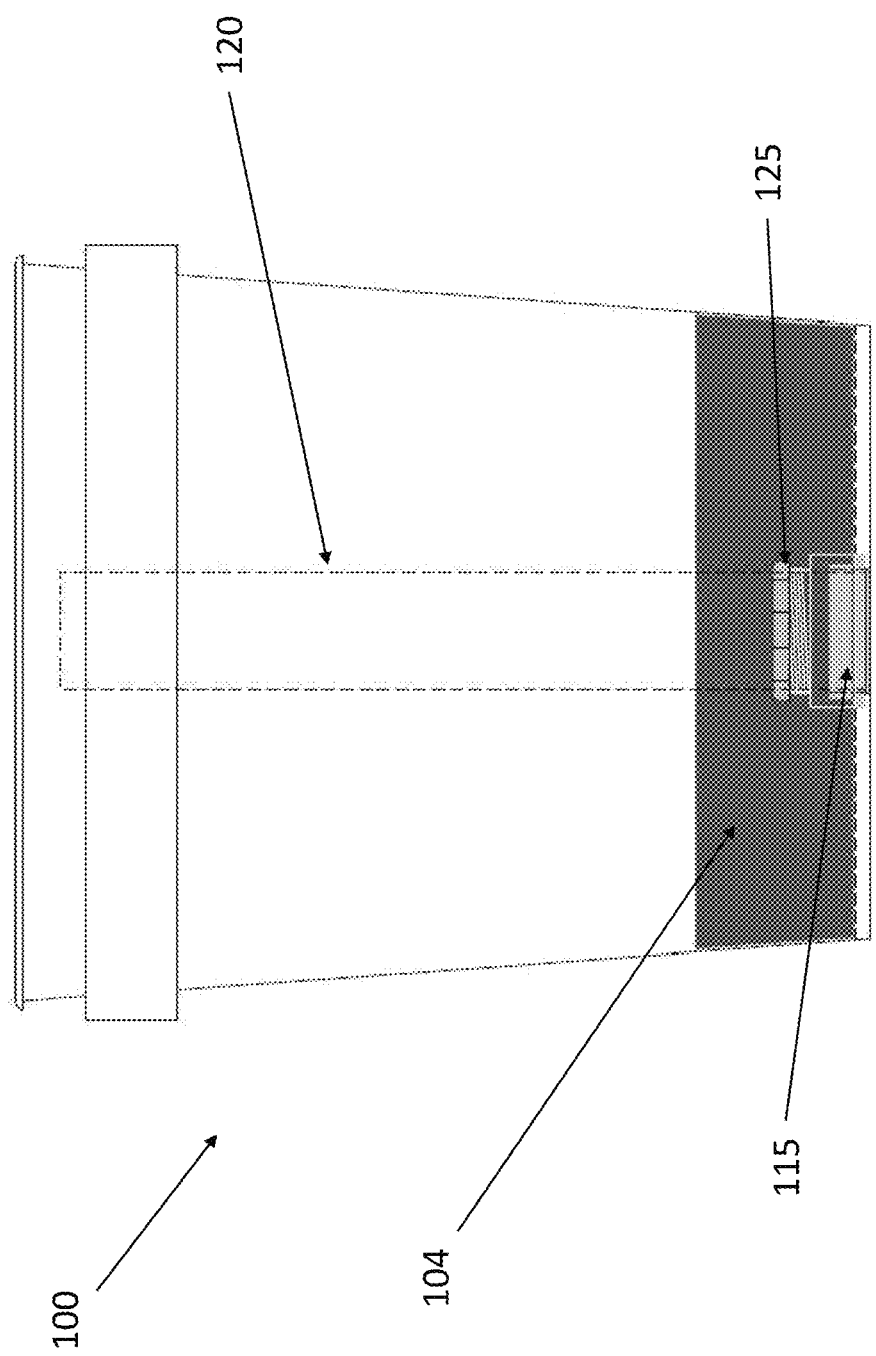
FIG. 7 illustrates a transparent side view of the 5-gallon bucket with a drainpipe and containing paint sludge according to the embodiments of the present invention.

FIGS. 4-6 show use of the bucket 100 in concert with a second bucket 200 to facilitate complete separation of the water and paint. FIG. 4 shows bucket 100 being positioned on a lid 205 of the second 5-gallon bucket 200. For reasons detailed below, the lid 205 includes a central opening (not shown) positioned below the drain 115 of bucket 100. Once bucket 100 is positioned on the lid 205 of bucket 200, the drainpipe 120, with the lid 130 removed, may be pushed down through the drain 115 into the bucket 200. In this manner, the separated clean water 103 may escape from bucket 100 through the drainpipe 120 into bucket 200. FIG. 6 shows all the separated clean water 103 in bucket 200 and the paint and paint sludge in bucket 100. As shown, the objective for the user is to lower the drainpipe 120 to the upper level 106 of the paint or paint sludge 104. By doing so, the amount of clean water 103 escaping bucket 100 is optimized while paint or paint sludge 104 are prevented from escaping into bucket 200 defeating the purpose of the system. FIG. 7 shows the bucket 100 with the drainpipe 120 in a home position and the remaining paint or paint sludge 104 after water 103 has been evacuated.

Figure 8:
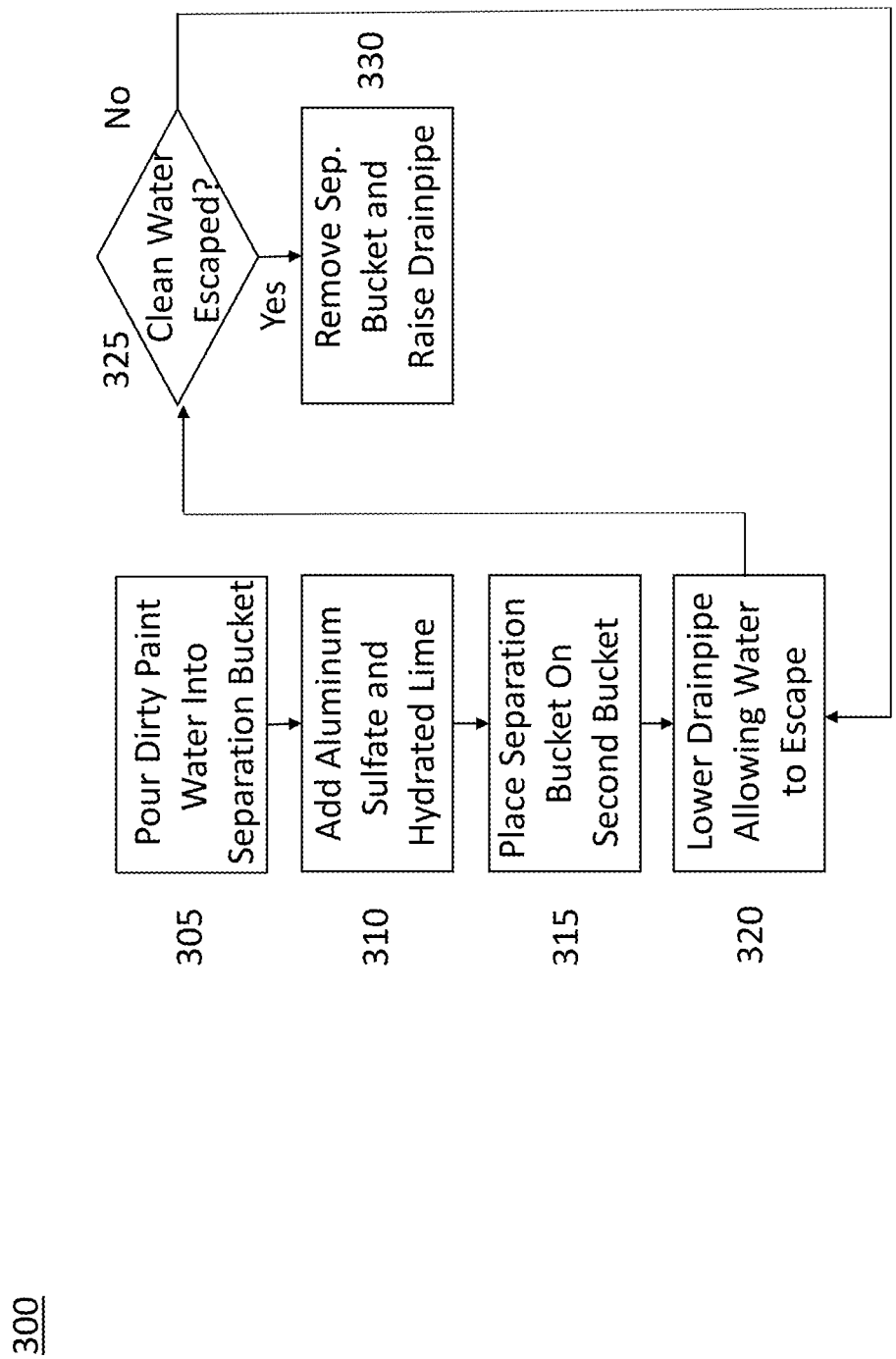
FIG. 8 is a flow chart detailing a methodology of utilizing the water and paint separation system according to the embodiments of the present invention.

FIG. 8 shows a flow chart 300 detailing a method of using the separation system according to the embodiments of the present invention. At 305, dirty water is poured into the separation bucket. At 310, aluminum sulfate and hydrated lime is added to the dirty water. At 315, the separation bucket is positioned or placed on another bucket having a lid with a central opening such that the drain of the separation bucket is aligned with the central opening. Once the water and paint have separated due to the aluminum sulfate and hydrated lime, at 320, the drainpipe is lowered (i.e., pushed down by the user) so that the clean water in the separator bucket can escape through the drainpipe into the bucket on which the separator bucket has been placed. This continues until such times as the top of the drainpipe is proximate to the paint or paint sludge at the bottom of the separator bucket. At 325, it is determined if all the clean water has escaped the separator bucket. If not, the drainpipe can continue to be lowered. If so, at 330, the separator bucket is removed from atop the bottom bucket and the drainpipe is returned to its home position (i.e., raised by the user).

Although the invention has been described in detail with reference to several embodiments, additional variations and modifications exist within the scope and spirit of the invention as described and defined in the following claims.

I claim:

1. A separator system comprising:
   a first bucket, said first bucket comprising a drain and a drainpipe having an upper opening, said drainpipe slidably engaged with said drain into a center of said basket; and
   a second bucket having a lid, said lid having an opening; and
   wherein said first bucket is configured to sit atop said second bucket with said drain aligned with said lid opening so that said drainpipe may be lowered into said second bucket allowing liquid from said first bucket to drain into said second bucket via said drainpipe when said upper opening of said drainpipe is slidably lowered into said liquid in said first bucket.

2. The separator system of claim 1 wherein said liquid comprises water.

3. The separator system of claim 2 wherein said water includes paint.

4. The separator system of claim 1 wherein said drain is positioned in a center of a bottom of said first bucket.

5. The separator system of claim 1 wherein said lid opening is positioned in a center of said lid of said second bucket.

6. The separator system of claim 1 further comprising a locking nut configured to secure said drainpipe to said drain in said first bucket in a fixed position when said drainpipe is not in use.

7. The separator system of claim 1 wherein said drainpipe has a lid.

8. A method comprising:
   pouring a water and paint mixture into a first bucket, said first bucket comprising a drain and a drainpipe having an upper opening, said drainpipe slidably engaged with said drain;
   adding aluminum sulfate to said water and paint mixture to causes causing separation of paint from water in said water and paint mixture;
   after said water and said paint separate, positioning said first bucket atop a second bucket having a bucket lid, said bucket lid having an opening aligned with said drain; and
   lowering said slidably engaged drainpipe through said drain to allow only said water to escape said first bucket via said upper open end of said drainpipe into said second bucket while said paint remains in said first bucket.

9. The method of claim 8 further comprising removing a drainpipe lid from said drainpipe prior to lowering said drainpipe.

10. The method of claim 8 further comprising releasing said drainpipe via a locking nut securing said drainpipe in a fixed position to said first bucket.

11. The method of claim 8 further comprising securing said drainpipe in a fixed position to said first bucket via a locking nut.

12. The method of claim 8 further comprising adding hydrated lime to said water and paint mixture.

13. A kit comprising:
- a first bucket, said first bucket comprising a drain and a drainpipe, said drainpipe slidably engaged with said drain;
- a second bucket having a lid, said lid having an opening; and
- aluminum sulfate in a quantity sufficient to separate paint from water in a quantity of a paint and water mixture which can be contained in said bucket.

14. The kit of claim 13 wherein said drain is positioned in a center of a bottom of said first bucket.

15. The kit of claim 13 wherein said opening is positioned in a center of said lid of said second bucket.

16. The kit of claim 13 further comprising a locking nut configured to secure said drainpipe in a fixed position to said first bucket.

17. The kit of claim 13 further comprising a drainpipe lid to cover an upper opening of said drainpipe.

18. The kit of claim 13 further comprising hydrated lime in a sufficient quantity to balance a pH of said water after separation from said paint.

* * * * *